United States Patent [19]

Lake

[11] Patent Number: 4,986,133
[45] Date of Patent: Jan. 22, 1991

[54] FLOW METER

[75] Inventor: Jack E. Lake, Racine, Wis.

[73] Assignee: Lake Monitors, Inc., Racine, Wis.

[21] Appl. No.: 486,807

[22] Filed: Mar. 1, 1990

[51] Int. Cl.$^5$ .............................................. G01F 1/22
[52] U.S. Cl. .................................................. 73/861.58
[58] Field of Search ............ 73/861.53, 861.54, 861.58

[56] References Cited

U.S. PATENT DOCUMENTS

| 4,282,761 | 8/1981 | Rosaen | 73/861.58 |
| 4,388,835 | 6/1983 | Rosaen | 73/861.58 |

Primary Examiner—Herbert Goldstein
Attorney, Agent, or Firm—Peter N. Jansson, Ltd.

[57] ABSTRACT

The improved flow meter has a generally cylindrical first tube with a rod assembly received in the tube and centrally supported therein. The rod portion of the rod assembly is tapered at a generally uniform rate over at least a portion of its length. An orifice disk has an aperture which is positioned generally concentric with the rod. This aperture coacts with the rod for providing an indication of the rate of flow of a fluid through the meter and against the urging of a spring. When fluid flows through the meter, the disk moves towards the second end of the tube and the magnitude of the movement has a known relationship to the rate of flow. A second embodiment of the flow meter includes a magnetized sleeve and a follower, the latter confined for movement between the first inner tube and the second outer tube. The orifice disk, sleeve and follower move coincidently and the meter is thereby adapted for use with opaque fluids. In either embodiment, the inventive flow meter is configured to be easily disassembled and reassembled so that a particular orifice disk may be replaced by a disk having a metering aperture of a different diameter. The meter is thereby made useful to measure flow rates over two or more different flow ranges.

14 Claims, 3 Drawing Sheets

FLOW METER

Field of the Invention

This invention is related generally to fluid flow meters and, more particularly, to a fluid flow meter which by interchange of parts may be easily adapted for differing flow ranges and which may be used with clear or opaque fluids.

Background of the Invention

Fluid flow meters are widely used for indicating the rate at which a fluid, a liquid or a gas, is flowing through a conductor. Such flow meters are typically installed in series with the conductor and flow rates indicated in volumetric units per unit of time, e.g., gallons per minute.

Various structures are used to indicate rate of flow and one such structure includes a hollow, spring biased, elongated piston which includes an opening of reduced diameter at one end. This piston coacts with a concentric tapered rod in a manner such that the area of the annular space defined between the opening and the rod varies with the relative position of the piston with respect to the rod. As the rate of fluid flowing through the meter increases, the piston will be urged in a direction to cause an increase in this annular area, such movement being against the urging of the spring. The piston continues movement and the area of the annular space continues to increase until the differential pressure across the piston is balanced against the opposing spring force. In other words, this position of force balance determines piston position with respect to the rod. An indication of flow is obtained by visually comparing the position of the piston (or a follower which moves coincident with the piston) relative to a flow rate scale mounted on the exterior of the meter.

Similar flow meters use the same fundamental structure of a tapered rod and piston and further incorporate switches and the like for providing electrical signals at particular flow rates. Examples of flow meters of these general types are shown in U.S. Pat. Nos. 3,805,611; 4,349,711; 4,389,901 and 4,487,077.

One of the disadvantages of such flow meters is that they are constructed to provide an indication of flow rate over only a single range of flows. For liquids, a meter of a particular configuration is usable only for fluids within a relatively narrow range of viscosities. If a user of such a flow meter encounters a need to measure a flow rate which is outside the range for which the meter is constructed, a separate, correctly calibrated flow meter must be purchased and installed for that purpose. In a processing plant where a large number of flow rates are routinely monitored at different locations and where such flow rates may change dramatically over time, the necessary inventory of flow meters is very significant.

Even if designers of earlier flow meters had appreciated how such meters could be arranged to indicate a rate of flow within any one of two or more ranges of flow, facilitating such an arrangement would be difficult. That is, known flow meters of the aforementioned type are constructed to prevent disassembly or at least make disassembly very difficult.

In addition, such flow meters are often constructed to be merely dustproof and this can be a disadvantage in some hostile industrial environments. Examples of such environments are dairies and other processing plants where water or chemical washdowns, including washing of equipment, frequently occurs.

Yet another consideration is that the transparent tubular bodies of some known flow meters are unprotected from accidental scratching or other damage. Lack of care in handling on the part of installers or store room handlers can impair the utility of such meters.

Still another disadvantage of such flow meters is that for any given tubular body length, the amount of travel of the piston is diminished. That is, the piston body occupies a significant portion of the length of the tubular body and the total available amount of piston travel is correspondingly reduced. The result is that the accuracy with which the flow scale can be read is reduced since such scale must be arranged along an indicating path of reduced length. Further, the substitutive exchange of pistons to adapt a meter to different flow ranges is relatively expensive.

An improved fluid flow meter which can be readily adapted for use over any one of two or more flow ranges, which is impervious to splashing liquids found in industrial environments, which affords protection for the tubular body and which permits the use of a flow scale of expanded length would be an important advance in the art.

Objects of the Invention

It is an object of this invention to overcome some of the problems and shortcomings of the prior art.

Another object of this invention is to provide a fluid flow meter which can be adapted for use over any one of two or more flow ranges.

Another object of this invention is to provide a fluid flow meter which uses a thin orifice disk.

Yet another object of this invention is to provide a fluid flow meter which may be easily disassembled and re-assembled.

Still another object of this invention is to provide a fluid flow meter wherein an orifice disk may be easily replaced with another disk to obtain indications of flow rates within a different range of flows.

Another object of the invention is to provide an improved flow meter which may be used with liquids having differing viscosities.

Another object of the invention is to provide an improved flow meter which may be used with clear or opaque fluids.

Yet another object of the invention is to provide a fluid flow meter in kit form wherein the kit includes at least two different orifice disks.

Still another object of the invention is to provide a fluid flow meter which affords protection for a transparent tubular body.

These and other important objects will be apparent from the descriptions of this invention which follow.

Summary of the Invention

In a first embodiment, the improved flow meter has a generally cylindrical first tube with a longitudinal axis and first and second ends. A rod assembly is received in the tube and has each of its ends supported by an aperture plate which is attached by a friction type fastener. Support of the assembly within the tube is such that the assembly is generally concentric with the tube. The rod portion of the rod assembly has a metering section which is tapered at a generally uniform rate over at least a portion of its length.

A generally planar, sharp-edged first orifice disk has a circular metering aperture which is positioned generally concentric with the metering section. This metering aperture coacts with the metering section for providing an indication of the rate of flow of a fluid through the meter. A spring confined within the tube urges the disk toward the first end of the tube. When fluid flows through the meter, the disk moves towards the second end of the tube and the magnitude of the movement has a known relationship to the rate of flow.

A porting assembly is removably received within each end of the tube and is arranged to provide fluid tight sealing engagement between the porting assembly and the tube. Since the porting assembly may be readily removed from each end of the tube and since the friction type fasteners may also be easily removed and replaced, the flow meter and its interior rod assembly may be quickly and easily disassembled. Replacement of the orifice disk by a different disk, one having a metering aperture of a different diameter, is thereby greatly facilitated. The ability to easily make such disk substitutions results in a flow meter useful to measure flow rates over two or more different flow ranges.

In a highly preferred embodiment, the first tube will be sufficiently transparent to permit viewing the position of the orifice disk. If a user wishes to know only whether a flow is present or absent or only wishes to obtain a gross indication of flow, any change in the position of the disk is readily observable for those purposes.

However, it is preferred that the flow meter also provide an accurate indication of the actual rate of flow and that such indication occur irrespective of which orifice disk is installed in the meter. That is, it is preferred that actual flow indication be available for rates of flow within any of two or more flow ranges. A flow meter of the type described above will have great utility when used with clear fluids or with fluids which are somewhat translucent but not so much so as to prevent observation of the position of an orifice disk.

A second embodiment of the inventive flow meter is useful with opaque fluids and includes, in addition to the structure described above, an annular, generally cylindrical magnetic sleeve which is interposed between the spring and the disk. Movement of the disk will result in coincident movement of the sleeve. A follower is formed at least in part of a magnetic material and is mounted adjacent the exterior of the first tube. This follower is magnetically coupled to the sleeve so that with changes in flow rate, the follower exhibits movement which is substantially coincident with movement of the sleeve.

A generally cylindrical second tube is supported at its first and second ends. The second tube is supported exterior the first tube in a concentric, spaced relationship for permitting movement of the follower within the free space defined between the first tube and the second tube. The first tube may be made of glass, plastic or a non-magnetic metal, depending upon the particulars of the application including the pressure of the fluid with which the meter is to be used. The second tube is sufficiently transparent to permit observation of the position of the follower.

The second tube is supported at each end by a resilient gland which is in fluid-sealing engagement with the tube. In a highly preferred embodiment, each gland has a shoulder which protrudes radially beyond the exterior surface of the second tube. When the flow meter is placed upon a generally flat surface, these shoulders help keep the second tube from being scratched or marred.

Each gland is retained and compressed for sealing by a porting assembly. As in the first embodiment, the porting assembly at each end of the meter is threaded or otherwise configured to permit attachment of the meter in series with a fluid conductor.

Detailed Descriptions of Preferred Embodiments

The figures show an improved flow meter 10 in accordance with the invention.

Figure 1:
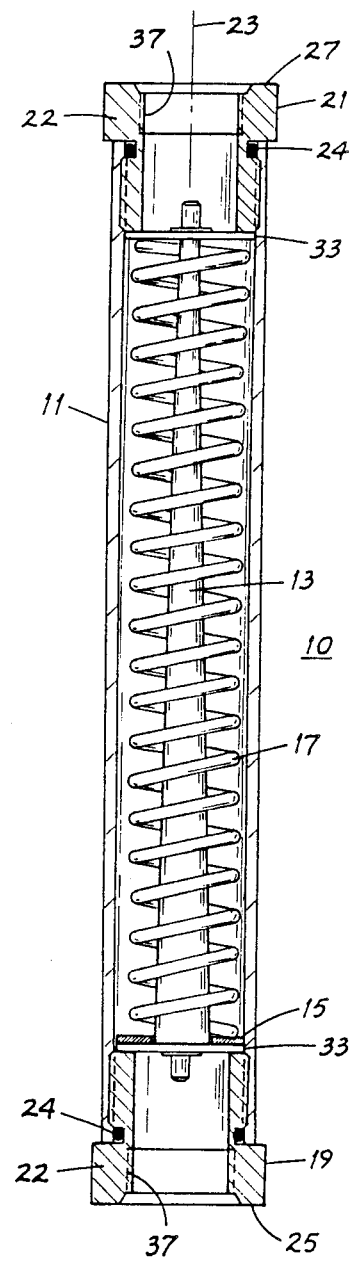
FIG. 1 is a side elevation view of a first embodiment of the flow meter with parts shown in cross section, other parts shown in dotted outline and still other parts shown in full representation.

Referring first to FIG. 1, a first embodiment of the flow meter 10 has as it primary components a first tube 11, a rod assembly 13, an orifice disk 15, a spring 17 and a pair of porting assemblies 19, 21. The tube 11 is generally cylindrical, has a longitudinal center axis 23 and may be formed of glass, of a plastic material or of any other material which is reasonably transparent. The material and its wall thickness are selected in view of the pressures prevailing in the fluid, the flow rate of which is to be measured.

The rod assembly 13 is confined within the interior of the tube 11 and at a position generally intermediate the first end 25 and the second end 27 of the tube 11. The rod assembly 13 includes a rod 29 which is supported at each of its ends 31 by an aperture plate 33 and in such a position that the rod 29 is generally concentric with the tube 11. The rod 29 includes a metering section 35 which is tapered at a generally uniform rate over at least a portion of its length.

A generally planar, sharp-edged first orifice disk 15 is positioned on the rod 29 to be generally concentric with the metering section 35. A preferred orifice disk 15 has a diameter several times its thickness ("length"), and preferably at least 8–10 times, may be made very inexpensively. As described in greater detail below, this orifice disk 15 coacts with the metering section 35 for providing an indication of the rate of flow of a fluid through the meter 10. A spring 17 is confined within the tube 11 and is arranged to urge the disk 15 toward the first end 25 of the tube 11. In the absence of flow through the meter 10, the spring 17 will urge the orifice disk 15 to a position adjacent the first end 25 which so indicates this condition.

A porting assembly 19, 21 is received within each end of the tube 11 and is arranged to provide fluid-tight sealing engagement between the porting assembly 19, 21 and the tube 11. Each porting assembly 19, 21 may be attached to the tube 11 by any of several ways such as by the use of an adhesive. However, in a highly preferred embodiment, the porting assembly 19, 21 will be threaded to the tube 11 so that the assembly may be easily removed and re-installed. Each porting assembly 19, 21 is generally hollow and includes a threaded port 37 for connection to the fluid conductor, a port fitting 22 and a resilient seal 24.

Figure 2:
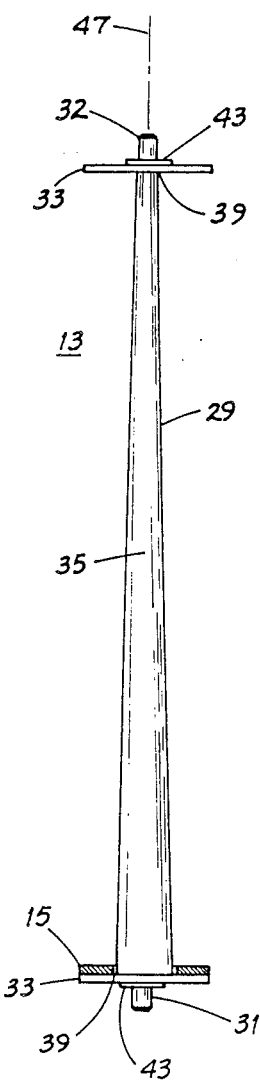
FIG. 2 is a side elevation view of a rod assembly, a component of the flow meter.
Figure 3:
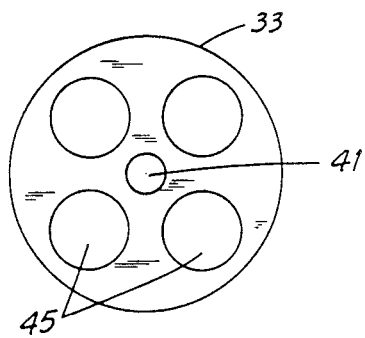
FIG. 3 is a plan view of an aperture plate with its associated friction type fastener.

Referring additionally to FIGS. 2 and 3, the rod 29 has a first stud end 31 and a second stud end, 32 each of which is embodied as a short projection having a generally uniform diameter. For either end 31, 32 this diameter is smaller than that of the adjacent metering section 35 so that a shoulder 39 is defined therebetween.

The metering section 35 has a generally circular cross-section along its length and is tapered at a generally uniform rate. The metering section 35 may be constructed to taper from its maximum diameter to its minimum diameter over only a portion of its length. When so constructed, the flow meter 10 will provide accurate flow indication only over such tapered portion. In a highly preferred embodiment, the metering section 35 will be tapered over substantially its entire length or at least over that portion of its length over which the orifice disk 15 makes its excursion. To state it another way, the greater the length of that portion of the metering section 35 with which the orifice disk 15 coacts, the more accurate will be the indication of flow for any given flow range.

Each aperture plate 33 is embodied as a thin, generally circular disk having a central opening 41 to receive an end 31, 32 of the rod 29. When mounted on an end 31 or 32 of the rod 29, each plate 33 is positioned to abut the adjacent shoulder 39. Attachment of a plate 33 to an end 31 or 32 is by a fastener 43, preferably of the removable, friction type.

Each aperture plate 33 also includes at least one and preferably a plurality of flow openings 45 for permitting the relatively free flow of fluid therethrough. That is, the aggregate area of these openings 45 should be sufficiently great to result in only a very small differential pressure across the plate 33 when fluid is flowing through the meter 10 at the maximum rate.

Each aperture plate 33 has a diameter only slightly less than the inside diameter of the first tube 11. Such construction will permit easy insertion and withdrawal of the rod assembly 13 into the first tube 11 while yet preventing significant leakage of fluid between the aperture plate 33 and the tube 11. When so constructed and arranged, the aperture plates 33 will support the rod 29 in a position such that the longitudinal axis 47 of the rod 29 is generally coincident with the longitudinal axis 23 of the tube 11.

Figure 4A:
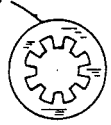
FIGS. 4A, 4B, and 4C, respectively, are perspective views of orifice disks having metering apertures of progressively increasing diameters.
Figure 4A:
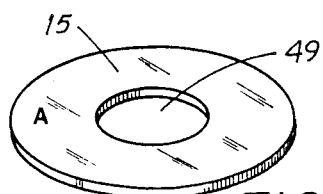

Referring next to FIGS. 1, 2 and 4A, a circular, generally planar, sharp-edged first orifice disk 15 has a circular metering aperture 49 concentrically formed therein. The metering aperture 49 has a diameter which is slightly larger than that portion of the metering section 35 adjacent the first stud end 31. When the disk 15 is installed in the position and location shown in FIGS. 1 and 2, the active disk, it will be generally concentric with the metering section 35 and movable upon the occurrence of a change in the rate of flow of fluid through the meter 10.

Figure 4B:
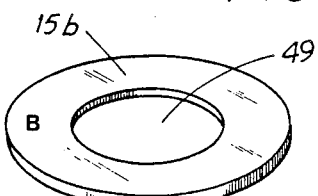
Figure 4C:
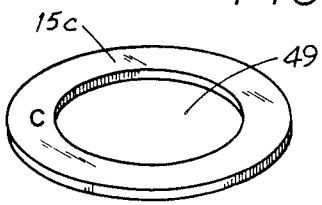

It is to be appreciated that if the metering aperture 49 has a diameter only slightly greater than the largest diameter of the metering section 35, the annular space between the disk 15 and the metering section 35 will have a relatively small area at zero flow. Referring additionally to FIGS. 4B and 4C, it will also be observed that for disks 15b, 15c having progressively larger metering apertures 49, the area of the annular space will likewise be larger at zero flow and will progressively increase as an orifice disk 15, 15b, 15c makes its excursion toward the second end 32. The relative differences in the diameters of the metering apertures 49 shown in FIGS. 4A-4C are exaggerated for illustration purposes.

A highly preferred orifice disk 15, 15b, 15c and its metering aperture 49 will present what is commonly known as a sharp-edged orifice to the flowing fluid. That is, the wall thickness of the disk 15, 15b, 15c is one-fourth or less of the square root of the cross-sectional area of the aperture 49. This better retains the laminar flow characteristics of the fluid flowing through the meter 10. Sharp edged orifices are described in textbooks relating to hydraulic devices.

The flow meter 10 will be provided with at least two and preferably three orifice disks 15, 15b, 15c, each of which has a metering aperture 49 with a diameter different from that of all other disks. One of the disks 15, 15b, 15c is installed in the meter while the other two are retained for possible later use.

Figure 5:
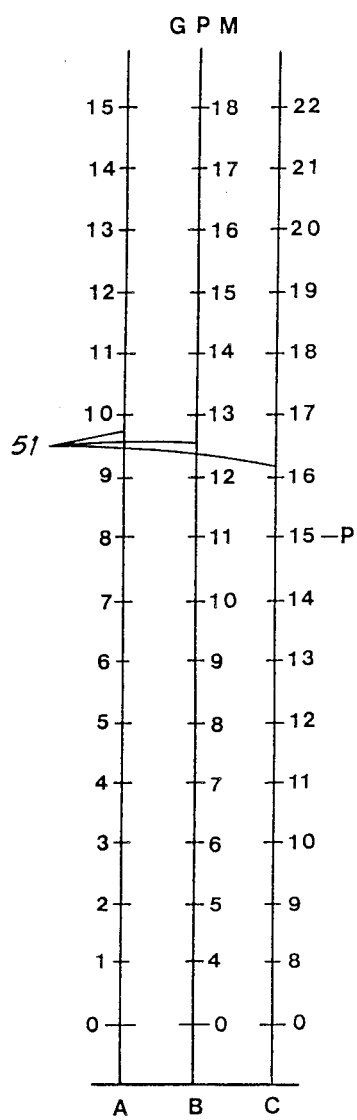
FIG. 5 depicts flow rate scales as may be used with the flow meter.

Even if the meter 10 is used without a flow scale, it is nevertheless useful to indicate the presence of fluid flow or to indicate a change in such flow. However, users of such flow meters usually purchase them to be able to obtain relatively accurate indications of actual rates of flow. Therefore, in a highly preferred embodiment the meter 10 will include a plurality of flow scales 51 as shown in FIG. 5. These scales 51 are affixed to the exterior of the first tube 11 and are positioned on the tube 11 and graduated in accordance with known principles of fluid flow rates, differential pressures and spring rates. When the position of a particular orifice disk 15, 15b or 15c is viewed with respect to a corresponding scale 51, that scale provides an indication of the rate of flow over a range of flows which is separate and distinct from the ranges reflected in other flow scales 51.

To help avoid inadvertent errors when using the flow meter 10 and its disks 15, 15b, 15c, each disk is preferably coded to a particular flow scale 51. Such coding may be by using a letter, e.g., "A", "B" or "C" to mark a disk 15, 15b, 15c and its corresponding scale 51 as shown. As an alternative, each disk 15, 15b, 15c and its corresponding scale 51 may be color coded and when so coded, one need not be able to view the surface of the disk 15, 15b, 15c to identify which disk 15, 15b, 15c is installed in the meter 10.

For a gas or for a liquid with an assumed constant viscosity, flow through the meter 10 will cause an orifice disk 15 to move toward the second end 27, thereby compressing the spring 17. For a given flow rate (within the range capability of the meter 10) the area of the annular space between the orifice disk 15 and the metering section 35 will increase to a value such that the differential pressure across the orifice disk 15 will be precisely counterbalanced by the opposing spring 17. The orifice disk 15 will therefore be in force equilibrium, no further movement of the disk 15 will occur and the flow rate may be determined by observing the position of the orifice disk 15 with respect to its corresponding scale.

As is apparent from the arrangement of the scales 51 in FIG. 5 and from a comparison of the diameters of the metering apertures 49 of the corresponding disks 15, 15b, 15c shown in FIGS. 4A-4C, the substitution of an orifice disk 15 having a metering aperture 49 with a larger diameter will result in an indication of a higher flow rate for any given position of a disk 15. That is, if flow through the meter 10 is such that an orifice disk 15 is at position "P", this would indicate a flow rate of 8 gpm if the "A" disk of FIG. 4A is in use, a flow rate of 11 gpm if the "B" disk of FIG. 4B is being used or a flow rate of 15 gpm if the "C" disk of FIG. 4C is used. The foregoing assumes that in all instances, fluid viscosity is substantially constant.

Figure 6:
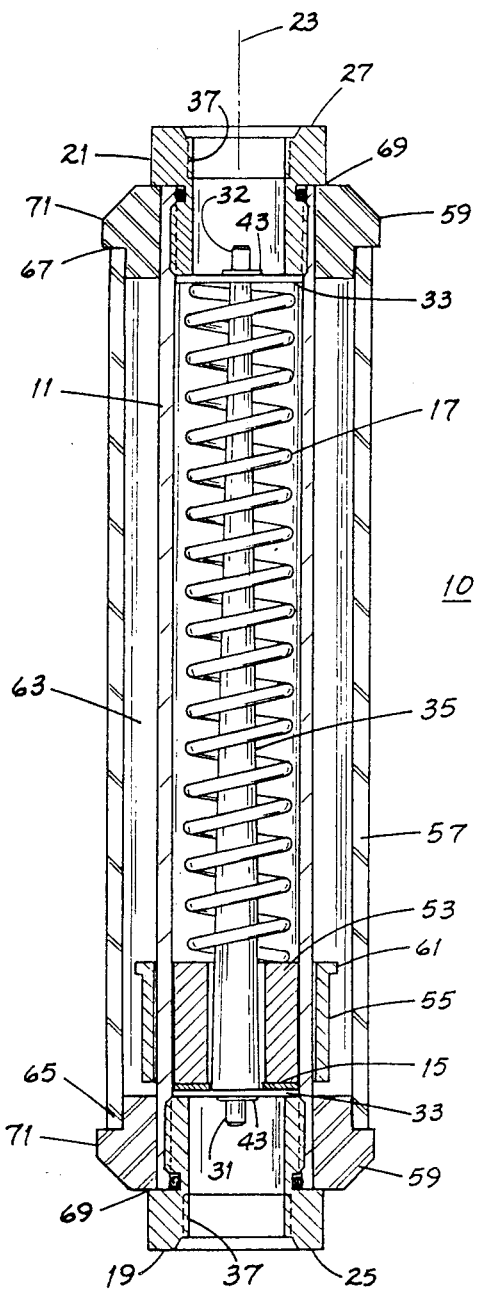
FIG. 6 is a side elevation view of a second embodiment of the flow meter with parts shown in cross section, other parts shown in dotted outline and still other parts shown in full representation.

Some fluids may be sufficiently opaque to prevent viewing the position of the orifice disk 15 when using the embodiment shown in FIG. 1. A second embodiment of the flow meter 10 is shown in FIG. 6 and is constructed to provide easy visual indication of the rate of flow, even if the fluid is extremely opaque. In the second embodiment, the flow meter 10 further includes a magnetized sleeve 53, a follower 55, a second tube 57 and a plurality of resilient glands 59.

The sleeve 53 is annular, generally cylindrical in shape and has an interior opening with a diameter appreciably greater than that of the largest diameter of the metering section 35. The resulting substantial annular space helps assure that the sleeve may move along the length of the metering section 35 with little or no friction therebetween. It also helps assure that the resistance to flow resulting from the presence of the sleeve 53 will be minimized. The outside diameter of the sleeve 53 is selected to be slightly smaller than the inside diameter of the first tube 11 so that the sleeve 53 may freely move within the first tube 11. The sleeve 53 is interposed between the spring 17 and the orifice disk 15 and moves coincidently with movement of the disk 15.

The follower 55 is also annular and generally cylindrical in shape and has an inside diameter only slightly greater than the outside diameter of the first tube 11. This permits the follower 55 to move freely along the first tube 11 without appreciable friction. At one end, the follower 55 has a collar 61 of slightly enlarged diameter which defines the "pointer" for indicating flow. The diameter of this collar 61 is selected to be somewhat less than the inside diameter of the second tube 57. This permits the collar 61 to move freely within the free space 63 defined by the first tube 11 and the second tube 57 while yet permitting the collar 61 to be readily visible through the second tube 57.

The follower 55 is formed at least in part of a magnetic material i.e., of a material which is attracted by a magnet but which is not necessarily permanently magnetized. In a preferred embodiment, the entire follower 55 will be formed of such magnetic material and in any event, the degree of magnetic coupling between the sleeve 53 and the follower 55 is such that the follower 55 exhibits flow-indicating movement which is substantially coincident with movement of the sleeve 53. Of course, the highest degree of magnetic coupling will result if both the sleeve 53 and the follower 55 are magnetized and are oppositely polarized.

The second tube 57 is generally cylindrical and has a first end 65 and a second end 67. The tube 57 is supported exterior the first tube 11 in a concentric, spaced relationship to the first tube 11. Support is by a pair of resilient glands 59, one gland 59 being positioned to support each end 65, 67 of the tube 57. Each gland 59 is retained in fluid-sealing engagement with the second tube 57, retention being by the flange 69 of a porting assembly 19, 21. When the porting assemblies 19, 21 are installed, each gland 59 will be compressed against the second tube 57 and against a flange 69 and in fluid-sealing engagement with both. The flow meter 10 is thereby made impervious to penetration by washdown sprays or airborne contaminants such as might be encountered in dairies, food or chemical processing plants or the like.

A preferred sealing gland 59 is annular, generally cylindrical in shape and has an inside diameter selected to snugly fit over the exterior of the first tube 11. The outside diameter of the gland 59 is selected to snugly fit with the inside diameter of the second tube 57. In a highly preferred embodiment, each gland 59 has a shoulder 71 which protrudes radially beyond the exterior surface of the second tube 57. When so constructed and when the meter 10 is placed upon a generally flat surface, these shoulders 71 support the exterior surface of the second tube 57 in a slightly spaced relationship from the surface upon which the meter 10 is resting. The glands 59 thereby aid in preventing the exterior surface from being scratched or marred.

In the second embodiment of the meter 10, it is unnecessary to be able to see through the first tube 11. Therefore, the first tube 11 may be constructed of an opaque plastic or of a non-magnetic material or of one of the other materials described above.

From the foregoing, it is to be appreciated that either embodiment of the meter 10 can be assembled and supplied to a customer with only a single orifice disk 15 and with a single corresponding flow scale 51. However, greater utility will result if the flow meter 10 is put up in kit form which includes, in addition to a disassembled meter or a meter assembled with an orifice disk 15, at least one and preferably two additional orifice disks such as disks 15, 15b, 15c. Because of the straightforward manner in which the flow meter 10 may be easily disassembled and re-assembled, an orifice disk 15 may be very simply and inexpensively substituted. The inclusion of corresponding plural flow scales 51 on the exterior of the meter 10 will facilitate the use of different disks 15.

While the principles of this invention have been described in connection with specific embodiments, it should be understood clearly that these descriptions are made only by way of example and are not intended to limit the scope of the invention.

What is claimed is:

1. An improved flow meter for indicating the rate of flow of a fluid flowing therethrough including:

-a generally cylindrical first tube having a longitudinal axis and first and second ends;

-a rod assembly including a plurality of aperture plates and a rod having first and second ends, the rod being supported at each of its ends by an aperture plate and in a position to be generally concentric with the tube, each aperture plate being attached to an end of the rod, the rod having a metering section which is tapered at a generally uniform rate over at least a portion of its length;

-a generally planar, sharp-edged first orifice disk having a circular metering aperture positioned generally concentric with the metering section and co-acting therewith for providing an indication of the rate of flow of a fluid through the meter;

-a spring confined within the tube for urging the disk toward the first end of the tube;

-a porting assembly received within each end of the tube and arranged to provide fluid-tight sealing engagement between the porting assembly and the tube;

-each porting assembly being removably received within each end of the tube and each aperture plate being attached to an end of the rod by a removable, friction fastener;

the flow meter thereby being adapted for easy disassembly and substitutive replacement of the orifice disk.

2. The flow meter of claim 1 further including a generally planar, sharp edged second orifice disk which may be easily substituted for the first orifice disk by disassembly of the flow meter, the second orifice disk having a metering aperture of a diameter which differs from that of the first orifice disk, the flow meter thereby being adapted to provide an indication of the rate of flow within either of two ranges of flow.

3. The flow meter of claim 2 wherein the minimum diameter of each orifice disk, as measured normal to the longitudinal axis of the tube when the disk is installed in the flow meter, is at least five times the thickness of the disk as measured parallel to the longitudinal axis of the tube.

4. The flow meter of claim 3 wherein each porting assembly is threadably coupled to the first tube.

5. The flow meter of claim 1 further including:

-an annular, generally cylindrically shaped magnetized sleeve interposed between the spring and the disk and confined within the first tube for movement coincident with movement of the orifice disk;

-a follower formed at least in part of a magnetic material and mounted adjacent the exterior of the first tube and in a magnetically coupled relationship to the sleeve, the follower thereby exhibiting movement which is substantially coincident with movement of the sleeve;

-a generally cylindrical second tube having first and second ends and being supported exterior the first tube in a concentric, spaced relationship thereto for permitting free movement of the follower;

-a plurality of resilient glands for supporting the second tube, each end of the second tube being supported by a gland in fluid-sealing engagement therewith, each gland being retained in such sealing engagement with the second tube by a porting assembly;

-the second tube being sufficiently transparent so that the position of the follower can be observed;

the flow meter thereby being adapted for use with opaque fluids.

6. The flow meter of claim 5 further including a generally planar, sharp edged second orifice disk which may be easily substituted for the first orifice disk by disassembly of the flow meter, the second orifice disk having a metering aperture of a diameter which differs from that of the first orifice disk, the flow meter thereby being adapted to provide an indication of the rate of flow within either of two ranges of flow.

7. The flow meter of claim 6 wherein the second tube includes an exterior surface and wherein each gland has a shoulder which protrudes radially beyond such exterior surface to support such exterior surface in a slightly spaced relationship from a generally planar surface upon which the flow meter may be placed, the glands thereby aiding in the prevention of scratching of such exterior surface.

8. The flow meter of claim 7 wherein the minimum dimension of each orifice disk, as measured normal to the longitudinal axis of the tube when the disk is installed in the flow meter, is at least five times the thickness of the disk as measured parallel to the longitudinal axis of the tube.

9. The flow meter of claim 8 wherein each porting assembly is threadably coupled to the first tube.

10. An improved flow meter kit having interchangeable orifice disks for indicating, within at least two flow ranges, the rate of flow of a fluid flowing therethrough including:

-a generally cylindrical first tube having a longitudinal axis and first and second ends;

-an elongate rod having a longitudinal axis and first and second stud ends, the rod further including a metering section disposed between the stud ends, the metering section being generally circular in cross-sectional shape and tapered at a substantially uniform rate over its length;

-an aperture plate mounted at each stud end, each aperture plate being embodied as a circular disk having a central opening for mounting to a stud end and further having at least one flow opening for permitting the relatively free flow of fluid therethrough, each aperture plate being secured to a stud end by a friction fastener, the aperture plates thereby supporting the rod within the first tube in a manner such that the longitudinal axes of the first tube and the rod are generally coincident with one another;

-a circular, generally planar, sharp-edged first orifice disk having a circular metering aperture concentrically formed in the disk and positioned generally concentrically with the metering section, the disk being movable with respect to the metering section upon the occurrence of a change in the rate of flow of fluid through the meter, the position of the disk providing an indication, within a first flow range, of the rate of flow of a fluid through the meter;

-a spring confined within the tube for urging a disk toward the first end of the tube;

-a porting assembly threadably received at each end of the first tube, each porting assembly having a port fitting and a resilient seal confined between the fitting and the first tube for providing sealing engagement with the tube;

-each porting assembly being removably received at each end of the tube; the flow meter kit further including:

-a separate generally planar, circular, sharp-edged second orifice disk which may be easily substituted for the first orifice disk by disassembly of the flow meter, the second orifice disk having a circular metering aperture of a diameter which differs from that of the first orifice disk, the second orifice disk thereby being capable of providing an indication, within a second flow range, of the rate of flow of a fluid through the meter;

the flow meter kit thereby being adapted to provide an indication of the rate of flow within either of two ranges of flow, depending upon whether the first disk or the second disk is installed therein.

11. The flow meter kit of claim 10 wherein the first orifice disk and the second orifice disk each have a thickness and a diameter and wherein the minimum diameter of each orifice disk is at least five times the thickness of that disk.

12. The flow meter kit of claim 11 further including a plurality of flow scales affixed to the exterior of the first tube, each scale providing an indication of rate of flow over a separate range of flows when the position of an orifice disk is viewed with respect to such scale.

13. The flow meter kit of claim 10 further including:
-an annular, generally cylindrically shaped magnetic sleeve interposed between the spring and the active disk and confined within the first tube for movement coincident with movement of the active disk;
-a follower formed of a magnetic material and mounted adjacent the exterior of the first tube and in a magnetically coupled relationship to the sleeve, the follower thereby exhibiting flow-indicating movement which is substantially coincident with movement of the sleeve; -a generally cylindrical second tube having first and second ends and being supported exterior the first tube in a concentric, spaced relationship thereto for defining a free space therebetween to permit free movement of the follower; -a plurality of resilient glands for supporting the second tube, each end of the second tube being supported by a gland in fluid-sealing engagement therewith, each gland being retained in such sealing engagement with the second tube by a porting assembly; -the second tube being sufficiently transparent so that the position of the follower can be observed;
the flow meter thereby being adapted for use with opaque fluids.

14. The flow meter kit of claim 13 further including a plurality of flow scales affixed to the exterior of the second tube, each scale providing an indication of rate of flow over a separate range of flows when the position of the follower is viewed with respect to such scale.

* * * * *

UNITED STATES PATENT AND TRADEMARK OFFICE
CERTIFICATE OF CORRECTION

PATENT NO. : 4,986,133

DATED : January 22, 1991

INVENTOR(S) : Jack E. Lake

It is certified that error appears in the above-identified patent and that said Letters Patent is hereby corrected as shown below:

Correct the formatting of claims 10 and 13 as follows:

Column 10:

10. An improved flow meter kit having interchangeable orifice disks for indicating, within at least two flow ranges, the rate of flow of a fluid flowing therethrough including:

-a generally cylindrical first tube having a longitudinal axis and first and second ends;

-an elongate rod having a longitudinal axis and first and second stud ends, the rod further including a metering section disposed between the stud ends, the metering section being generally circular in cross-sectional shape and tapered at a substantially uniform rate over its length;

-an aperture plate mounted at each stud end, each aperture plate being embodied as a circular disk having a central opening for mounting to a stud end and further having at least one flow opening for permitting the relatively free flow of fluid therethrough, each aperture plate being secured to a stud end by a friction fastener, the aperture plates thereby supporting the rod within the first tube in a manner such that the longitudinal axes of the first tube and the rod are generally coincident with one another;

-a circular, generally planar, sharp-edged first orifice disk having a circular metering aperture concentrically formed in the disk and positioned generally concentrically with the metering section, the disk being movable with respect to the metering section upon the occurrence of a change in the rate of flow of fluid through the meter, the position of the disk providing an indication, within a first flow range, of the rate of flow of a fluid through the meter;

UNITED STATES PATENT AND TRADEMARK OFFICE
CERTIFICATE OF CORRECTION

PATENT NO. : 4,986,133

DATED : January 22, 1991

INVENTOR(S) : Jack E. Lake

It is certified that error appears in the above-identified patent and that said Letters Patent is hereby corrected as shown below:

-a spring confined within the tube for urging a disk toward the first end of the tube;
    -a porting assembly threadably received at each end of the first tube, each porting assembly having a port fitting and a resilient seal confined between the fitting and the first tube for providing sealing engagement with the tube;

-each porting assembly being removably received at each end of the tube;

the flow meter kit further including:

-a separate generally planar, circular, sharp-edged second orifice disk which may be easily substituted for the first orifice disk by disassembly of the flow meter, the second orifice disk having a circular metering aperture of a diameter which differs from that of the first orifice disk, the second orifice disk thereby being capable of providing an indication, within a second flow range, of the rate of flow of a fluid through the meter;

the flow meter kit thereby being adapted to provide an indication of the rate of flow within either of two ranges of flow, depending upon whether the first disk or the second disk is installed therein.

UNITED STATES PATENT AND TRADEMARK OFFICE
CERTIFICATE OF CORRECTION

PATENT NO. : 4,986,133

DATED : January 22, 1991

INVENTOR(S) : Jack E. Lake

It is certified that error appears in the above-identified patent and that said Letters Patent is hereby corrected as shown below:

Columns 11 and 12:

13. The flow meter kit of claim 10 further including:

-an annular, generally cylindrically shaped magnetic sleeve interposed between the spring and the active disk and confined within the first tube for movement coincident with movement of the active disk;

-a follower formed of a magnetic material and mounted adjacent the exterior of the first tube and in a magnetically coupled relationship to the sleeve, the follower thereby exhibiting flow-indicating movement which is substantially coincident with movement of the sleeve;

-a generally cylindrical second tube having first and second ends and being supported exterior the first tube in a concentric, spaced relationship thereto for defining a free space therebetween to permit free movement of the follower;

-a plurality of resilient glands for supporting the second tube, each end of the second tube being supported by a gland in fluid-sealing engagement therewith, each gland being retained in such sealing engagement with the second tube by a porting assembly;

-the second tube being sufficiently transparent so that the position of the follower can be observed;

UNITED STATES PATENT AND TRADEMARK OFFICE
CERTIFICATE OF CORRECTION

PATENT NO. : 4,986,133

DATED : January 22, 1991

INVENTOR(S) : Jack E. Lake

It is certified that error appears in the above-identified patent and that said Letters Patent is hereby corrected as shown below:

the flow meter thereby being adapted for use with opaque fluids.

Signed and Sealed this

Twenty-eighth Day of July, 1992

Attest:

DOUGLAS B. COMER

*Attesting Officer*     Acting Commissioner of Patents and Trademarks

UNITED STATES PATENT AND TRADEMARK OFFICE
CERTIFICATE OF CORRECTION

PATENT NO. : 4,986,133
DATED : January 22, 1991
INVENTOR(S) : Jack E. Lake

It is certified that error appears in the above-identified patent and that said Letters Patent is hereby corrected as shown below:

On the cover of the patent, the References Cited should read as

U.S. PATENT DOCUMENTS

| | | | |
|---|---|---|---|
| 4,282,761 | 8/1981 | Rosaen | 73/861.58 |
| 4,388,835 | 6/1983 | Rosaen | 73/861.58 |
| 1,111,684 | 9/1914 | Vaughn | -- |
| 2,325,884 | 8/1943 | Schorn | 73/209 |
| 2,380,399 | 7/1945 | Bowie | 73/209 |
| 2,425,691 | 8/1947 | Brewer | 73/209 |
| 2,574,866 | 11/1951 | Fahrlander | 73/210 |
| 2,638,582 | 5/1953 | Urso et al. | 340/282 |
| 3,196,673 | 7/1965 | Carson | 73/118 |
| 3,218,853 | 11/1965 | Ongaro | 73/208 |
| 3,283,578 | 11/1966 | Moore | 73/321 |
| 3,398,305 | 8/1968 | Brewer | 310/104 |
| 3,554,031 | 1/1971 | Turner | 73/210 |
| 3,757,577 | 9/1973 | Bozek | 73/209 |
| 3,805,611 | 4/1974 | Hedland | 73/209 |
| 3,979,955 | 9/1976 | Schulte et al. | 73/228 |
| 4,349,711 | 9/1982 | Lake | 200/153LA |
| 4,389,901 | 6/1983 | Lake | 73/861.58 |
| 4,424,716 | 1/1989 | Boehringer | 73/861.56 |
| 4,619,139 | 10/1986 | Rosaen | 73/198 |
| 4,487,077 | 12/1984 | Lake | 73/861.58 |

UNITED STATES PATENT AND TRADEMARK OFFICE
CERTIFICATE OF CORRECTION

PATENT NO. : 4,986,133                                 Page 2 of 2
DATED     : January 22, 1991
INVENTOR(S) : Jack E. Lake It is certified that error appears in the above-identified patent and that said Letters Patent is hereby corrected as shown below:

FOREIGN PATENT DOCUMENTS

| | | |
|---|---|---|
| 654,129   | 6/1951  | United Kingdom |
| 612,710   | 1/1961  | Canada |
| 51,997    | 11/1966 | East Germany |
| 535,746   | 10/1931 | Germany |
| 611,476   | 10/1960 | Italy |
| 252,803   | 1/1948  | Switzerland |
| 2,135,784 | 9/1984  | United Kingdom |
| 2,146,115 | 3/1973  | West Germany |

Signed and Sealed this

Sixth Day of June, 2000

*Attest:*

*Attesting Officer*

Q. TODD DICKINSON

*Director of Patents and Trademarks*